United States Patent Office 3,702,805
Patented Nov. 14, 1972

3,702,805
PROCESS FOR THE PRODUCTION OF A DEXTRAN-DEGRADING ENZYME
Keijiro Ishibashi, Tokio Okaniwa, Atsushi Hattori, and Masetoshi Arai, Tokyo, Japan, assignors to Sankyo Company Limited, Tokyo, Japan
No Drawing. Continuation of application Ser. No. 863,718, Oct. 3, 1969. This application Dec. 15, 1971, Ser. No. 208,389
Claims priority, application Japan, Oct. 3, 1968, 43/72,026; Nov. 5, 1968, 43/80,871; Jan. 24, 1969, 44/5,108; May 10, 1969, 44/36,004
Int. Cl. C07g 7/02
U.S. Cl. 195—66 R                           5 Claims

ABSTRACT OF THE DISCLOSURE

An improved process for the production of dextranase which comprises culturing a dextranase-producing microorganism selected from the genera Chaetomium, Humicola, Sporotrichum, Anixiella, Macrosporium, Streptomyces, Gibberella, Gloeosporium and Glomerella, particularly *Chaetomium spirale, Chaetomium gracile, Sporotrichum asteroides,* or *Gibberella fujikuroi* in a fermentation medium and recovering from said medium the dextranase which accumulates therein.

Dextranase itself is known to be useful, for example, as enzymatic preparations for prevention of tooth decay or scale deposit.

---

This application is a continuation of Ser. No. 863,718 filed Oct. 3, 1969.

This invention relates to a process for the production of a dextran-degrading enzyme, dextranase, by the cultivation of certain microorganisms, the particular preference of which we found.

Dextran partially hydrolyzed with dextranase has been used in the preparation of blood serum substitutes. Recently, dextranase has found several applications (e.g. as enzymatic preparations for prevention of tooth decay or scale deposit) in the field of dental hygiene.

Heretofore, it has been known that dextranase can be produced by the cultivation of microorganisms which belong to the genera, Penicillium, Aspergillus, Verticillium and Spicaria, as well as Celluvibrio. (See, for example, Acta. Chem. Scand. 3, 1405 (1949); U.S. Pat. 2,709,150; J. Bact. 64, 513 (1952); Acta. Chem. Scand. 2, 803 (1948); and Canadian Journal of Microbiology 3, 239 (1957).)

As the result of our extensive research, we have now found that certain microorganisms whose dextranase-producing activity has been neither known nor suggested are quite effective in the large scale, biological production of dextranase.

In accordance with the present invention, there is provided a process for the production of dextranase by the cultivation of a dextranase-producing strain selected from the genera Chaetomium, Humicola, Sporotrichum, Anixiella, Macrosporium, Streptomyces, Gibberella, Gloeosporium, and Glomerella. Desired dextranase can be recovered from the culture broth in the conventional manner known per se.

Suitable microorganisms which are used as dextranase-producing strains in the process of the invention are known strains and can be illustrated in the following list, in which the right column indicates the literatures showing the mycological characteristics of the microorganism(s) concerned. The code numbers indicated are those solely used in the applicant, Sankyo Co. Ltd., for classification.

| | |
|---|---|
| Chaetomium: <br> C. spirale F-216-3 <br> C. gracile F-212-8 <br> (Fermentation Research Institute of Japan, Deposit No. 334). <br> C. subspirale F-216-4 <br> C. bostrychodes F-203-5 | Journal of General and Applied Microbiology 6, 223–251 (1960). |
| Streptomyces: <br> S. cinnamonensis Act 4-2 <br> (Fermentation Research Institute of Japan, Deposit No. 339). <br> S. flavovirens Act 8-5 <br> S. griseocarneus Act 12-1 <br> S. griseolus Act 12-3 | Bergey's Manual of Determinative Bacteriology 7th Ed. 771, 763, 775 and 766. |
| Gibberella: <br> G. fujikuroi G-13 (Fermentation Research Institute of Japan, Deposit No. 309). | Agricultural Experimental Reports, Agricultural Experiment Station of Agricultural and Commercial Department of Japan, 12, 1, 110 (1898). |
| G. saubinetii F-14-10 | Hokkaido-Nokaiho (Japan) 12, 133, 1 (1912). |
| Gloeosporium: <br> G. kaki G-12 (Fermentation Research Institute of Japan, Deposit No. 308). | "Pathological and Therapeutical Studies on Important Parasitic Diseases of Persimmon" by S. Ikata, 282 (1942), Yokendo, Japan. |
| G. laeticolor G-11 | Annals of the Phytopathological Society of Japan, 13, 3–4, 57 (1949). |
| G. olivarum G-9 | Ibid. 2, 6, 550 (1933). |
| Glomerella: <br> G. fluctigena G-10 (Fermentation Research Institute of Japan, Deposit No. 307). <br> G. lagenaria G-8 | Annals of the Phytopathological Society of Japan, 16, 137 (1952). |
| Humicola: H. grisea F-56-4 (Fermentation Research Institute of Japan, Deposit No. 336). | "A Manual of Soil Fungi" by Gilman, 325–326 (1957). |
| Sporotrichum: S. asteroides F-60-9 (Fermentation Research Institute of Japan, Deposit No. 337). | "Pathogenic Microbiology" (part Bacteria), 956–957 (1966), Igakushoin, Japan. |
| Anixiella: A. reticulata F-200-2 (Fermentation Research Institute of Japan, Deposit No. 335). | Transactions of the Micrological Society of Japan, 6, 3, 85 (1965). |
| Macrosporium: M. bataticola F-57-1 (Fermentation Research Institute of Japan, Deposit No. 338). | "Nogyo Oyobi Engei" (Agriculture and Horticulture), 22, 5, p. 239 (1947). |

As will be obvious for those skilled in the art, any mutants and variants of the above-illustrated strains are also usable in the present invention.

In carrying out the present invention in practice, a suitable dextranase-producing strain as referred to above is inoculated to a liquid or solid culture which contains various nutrient materials commonly used in an artificial or natural medium. Cultivation is then usually conducted by surface or submerged culture. Suitable nutrient materials include, for example, wheat bran, soybean meal, corn steep liquor, peptone, starch, glucose, sucrose, ammonium sulfate, urea and various other inorganic salts. Addition of 1–2% dextran to the culture medium is particularly preferable because this usually increases the dextranase productivity up to ten or more times, as compared with the cultivation under non-dextran condition. Suitable cultivation temperature is about 30° C. Suitable pH may be within the range of about 5.5–7.0. Cultivation period will vary depending on other cultivation conditions but it usually is about 3 to 5 days within which a maximum potency of desired dextranase will be obtained.

Isolation and purification of desired enzyme (dextranase) from a liquid culture broth or a koji extract can be carried out in the ordinary manner which is known in the recovery of any enzyme from the fermentation broth containing the same. For example, the culture broth or aqueous koji extract obtained by the cultivation may be subjected to any one of the following steps, i.e. concentration under reduced pressure, salting out with sodium sulfate or sodium chloride, fractional precipitation with methanol, ethanol, acetone or the like solvent, adsorption-elution cycle using a suitable adsorbent material, precipitation using a protein precipitating agent, precipitation at an isoelectric point, separation of impurities with a heavy metal, electric dialysis, etc. These steps may be employed alone or in combination thereby to obtain dextranase of desired purity.

The dextran-degrading enzyme thus obtained (dextranase) can decompose dextran intensely with the result of rapid liquefaction. Its optimum effective pH is 4–6 and its optimum temperature is 55°–60° C. The pH value and temperature at which dextranase is stable are 4–9 and 55° C. or lower, respectively.

The enzymatic activity of dextranase can be determined as follows: 5 ml. of a M/20 acetate buffer solution (pH 5.1) of 4.95% dextran ("Dextran 2000," manufactured and sold by Pharmacia Ltd., Sweden) is added with 0.5 ml. of a suitably diluted enzyme solution and the test mixture is kept at 40° C. The time required for reducing the initial viscosity of dextran to a half (this is referred to hereafter as "time of half decay") is measured. The measured value is proportional to the enzymatic activity.

Now the following examples serve to show the present invention in detail.

EXAMPLE 1

100 ml. of liquid culture medium (adjusted at pH 6.0) which contains 1% potato starch, 0.5% corn steep liquor, 0.5% peptone and 0.5% soybean meal, together with or without 1% dextran is placed in a 500 ml.-volume Erlenmeyer flask, sterilized and then inoculated with various strains specified below. Cultivation is conducted by shaking culture at 30° C. for 4 days. The dextranase enzymatic activity of the culture broth thus obtained is determined. Test results in each runs are set forth in Table 1.

TABLE 1

| Strain used | Time of half decay | |
|---|---|---|
| | Dextran not added (no dilution) | Dextran added (4 times dilution) |
| Chaetomium spirale F-216-3 | 60 minutes | 15 minutes |
| Chaetomium gracile F-212-8 | do | 13 minutes |
| Chaetomium subspirale F-212-8 | 6 hours | |
| Chaetomium bostrychodes F-203-5 | | Do. |

Note.—Initial viscosity of the test mixture: 150 seconds; water as blank: 10 seconds.

EXAMPLE 2

A solid culture medium is prepared by mixing wheat bran with its half amount of soybean meal, together with or without 2% dextran and adding an equal amount of water to the mixture, thereby forming the pasty mass. After sterilization, this solid culture medium is inoculated with various strains as specified below. Cultivation is conducted at 30° C. for 5 days according to koji culture method. The cultivation mass is extracted with water in amount of 10 or 100 parts per part of said mass. The aqueous extract is examined to determine its enzymatic activity. The text results are set forth in Table 2.

TABLE 2

| Strain used | Time of half decay | |
|---|---|---|
| | Dextran not added (extract with 10× water) | Dextran added (extract with 100× water) |
| Chaetomium spirale F-216-3 | 30 minutes | 13 minutes |
| Chaetomium gracile F-212-8 | do | 16 minutes |
| Chaetomium subspirale F-216-4 | | 6 hours |
| Chaetomium bostrychodes F-203-5 | | Do. |

Note.—Initial viscosity of the test mixture: 150 seconds; water as blank: 10 seconds.

EXAMPLE 3

The cultivation mass obtained under dextran-induced condition in Example 2 is extracted with water in amount of 3 parts by volume per part of said mass. To the resulting enzyme solution, acetone is added in amount of 3 parts by volume per part of the enzyme solution. The resulting precipitate is separated by filtration and then dried under reduced pressure. An enzyme sample is obtained as white powder. Yield 3–5% based on the total weight of the initial solid medium components. The enzymatic activity of this sample is determined with the following results.

TABLE 3

| Strain used | Time of half decay of 0.05% enzyme sample solution, min. |
|---|---|
| Chaetomium spirale F-216-3 | 25 |
| Chaetomium gracile F-212-8 | 20 |

Note.—Initial viscosity of the test mixture: 150 seconds; water as blank: 10 seconds.

EXAMPLE 4

100 ml. of a liquid culture medium (adjusted at pH 6.0) which contains 1% potato starch, 0.5% corn steep liquor, 0.5% peptone and 0.5% soybean meal, together with or without 1% dextran is placed in a 500 ml.-volume Erlenmeyer flask, sterilized and then inoculated with various strains specified below. Cultivation is conducted by shaking culture at 30° C. for 4 days. The dextranase enzymatic activity of the culture broth thus obtained is determined. Test results in each runs are set forth in Table 4.

TABLE 4

| Strain used | Time of half decay | |
|---|---|---|
| | Dextran not added (no dilution) | Dextran added (no dilution) |
| Streptomyces cinnamonensis Act 4-2 | 4 hours | 31 minutes |
| Streptomyces flavovirens Act 8-5 | 10 hours | 100 minutes |
| Streptomyces griseocarneus Act 12-1 | | 8 hours |
| Streptomyces griseolus Act 12-3 | | 10 hours |

Note.—Initial viscosity of the test mixture: 50 seconds; water as blank: 10 seconds.

EXAMPLE 5

A solid culture medium is prepared by mixing wheat bran with its half amount of soybean meal, together with or without 2% dextran and adding an equal amount of water to the mixture, thereby forming the pasty mass. After sterilization, this solid culture medium is inoculated with various strains as specified below. Cultivation is conducted at 30° C. for 5 days according to koji culture method. The cultivation mass is extracted with water in amount of 10 parts per part of said mass. The aqueous extract is examined to determine its enzymatic activity. The test results are set forth in Table 5.

TABLE 5

| Strain used | Time of half decay | |
|---|---|---|
| | Dextran not added (extract with 10X water) | Dextran added (extract with 10X water) |
| Streptomyces cinnamonensis Act 4-2 | 15 hours | 150 minutes. |
| Streptomyces flavovirens Act 8-5 | | 8 hours. |

NOTE.—Initial viscosity of the test mixture: 50 seconds; water as blank: 10 seconds.

EXAMPLE 6

The culture broth obtained under dextran-induced condition in Example 4 is added with acetone in amount of 3 parts by volume per part of the said broth. The resulting precipitate is separated by filtration and then dried under reduced pressure. An enzyme sample is obtained as white powder. Yield 3–5% based on the weight of the culture broth. The enzymatic activity of this sample is determined with the following results.

TABLE 6

| Strain used | Time of half decay of 0.5% enzyme sample solution, min. |
|---|---|
| Streptomyces cinnamonensis Act 4-2 | 15 |
| Streptomyces flavovirens Act 8-5 | 45 |

NOTE.—Initial viscosity of the test mixture: 50 seconds; water as blank: 10 seconds.

EXAMPLE 7

100 ml. of a liquid culture medium (adjusted at pH 6.0) which contains 1% potato starch, 0.5% corn steep liquor, 0.5% peptone and 0.5% soybean meal, together with or without 1% dextran is placed in a 500 ml.-volume Erlenmeyer flask, sterilized and then inoculated with various strains specified below. Cultivation is conducted by shaking culture at 30° C. for 4 days. The dextranase enzymatic activity of the culture broth thus obtained is determined. Test results in each runs are set forth in Table 7.

TABLE 7

| Strain used | Time of half decay | |
|---|---|---|
| | Dextran not added (no dilution) | Dextran added (4 times dilution) |
| Humicola grisea F-56-4 | 4 hours | 100 minutes. |
| Sporotrichum asteroides F-60-9 | 90 minutes | 20 minutes. |
| Anixiella reticulata F-200-2 | | 6 hours. |
| Macrosporium bataticola F-57-1 | | Do. |

NOTE.—Initial viscosity of the test mixture: 150 seconds; water as blank: 10 seconds.

EXAMPLE 8

A solid culture medium is prepared by mixing wheat bran with its half amount of soybean meal, together with or without 2% dextran and adding an equal amount of water to the mixture, thereby forming the pasty mass. After sterilization, this solid culture medium is inoculated with various strains as specified below. Cultivation is conducted at 30° C. for 5 days according to koji culture method. The cultivation mass is extracted with water in amount of 10 or 100 parts per part of said mass. The aqueous extract is examined to determine its enzymatic activity. The test results are set forth in Table 8.

TABLE 8

| Strain used | Time of half decay | |
|---|---|---|
| | Dextran not added (extract with 10X water) | Dextran added (extract with 100X water) |
| Humicola grisea F-56-4 | 30 minutes | 150 minutes. |
| Sporotrichum asteroides F-60-9 | 10 minutes | 55 minutes. |
| Anixiella reticulata F-200-2 | | 6 hours. |
| Macrosporium bataticola F-57-1 | | Do. |

NOTE.—Initial viscosity of the test mixture: 150 seconds; water as blank: 10 seconds.

EXAMPLE 9

The cultivation mass obtained under dextran-induced condition in Example 8 is extracted with water in amount of 3 parts by volume per part of said mass. To the resulting enzyme solution, acetone is added in an amount of 3 parts by volume per part of the enzyme solution. The resulting precipitate is separated by filtration and then dried under reduced pressure. An enzyme sample is obtained as white powder. Yield 3–5% based on the total weight of the initial solid medium components. The enzymatic activity of this sample is determined with the following results.

TABLE 9

| Strain used | Time of half decay of 0.15% enzyme sample solution, min. |
|---|---|
| Humicola grisea F-56-4 | 90 |
| Sporotrichum asteroides F-60-9 | 30 |

NOTE.—Initial viscosity of the test mixture: 150 seconds; water as blank: 10 seconds.

EXAMPLE 10

100 ml. of a liquid culture medium (adjusted at pH 6.0) which contains 1% potato starch, 0.5% corn steep liquor, 0.5% peptone and 0.5% soybean meal, together with 1% dextran is placed in a 500 ml.-volume Erlenmeyer flask, sterilized and then inoculated with various strains specified below. Cultivation is conducted by shaking culture at 30° C. for 4 days. The dextranase enzymatic activity of the culture broth thus obtained is determined. Test results in each runs are set forth in Table 10.

TABLE 10

| Strain used: | Time of half decay | |
|---|---|---|
| Gibberella fujikuroi G-13 | minutes | 10 |
| Gibberella saubinetii F-14-10 | hours | 2 |
| Gloeosporium kaki G-12 | do | 4 |
| Gloeosporium laeticolor G-11 | do | 8 |
| Gloeosporium olivarum G-9 | do | 10 |
| Glomerella fructigena G-10 | do | 10 |
| Glomerella lagenaria G-8 | do | 24 |
| Initial viscosity of the test mixture | sec | 150 |
| Water as blank | sec | 10 |

EXAMPLE 11

A solid culture medium is prepared by mixing wheat bran with its half amount of soybean meal, together with 2% dextran and adding an equal amount of water to the mixture, thereby forming the pasty mass. After sterilization, this solid culture medium is inoculated with various strains as specified below. Cultivation is conducted at 30° C. for 5 days according to koji culture method. The cultivation mass is extracted with water in an amount of 10 parts per part of said mass. The aqueous extract is examined to determine its enzymatic activity. The test results are set forth in Table 11.

TABLE 11

| Strain used: | Time of half decay | |
|---|---|---|
| Gibberella fujikuroi G-13 | minutes | 5 |
| Gibberella saubinetii F-14-10 | hours | 2 |
| Gloeosporium kaki G-12 | do | 3 |
| Gloeosporium laeticolor G-11 | do | 5 |
| Gloeosporium olivarum G-9 | do | 6 |
| Glomerella fructigena G-10 | do | 6 |
| Glomerella lagenaria G-8 | do | 12 |
| Initial viscosity of the test mixture | sec | 150 |
| Water as blank | sec | 10 |

EXAMPLE 12

The cultivation mass obtained under dextran-induced condition in Example 11 is extracted with water in amount of 3 parts by volume per part of said mass. To the resulting enzyme solution, acetone is added in an amount of 3 parts by volume per part of the enzyme solution. The resulting precipitate is separated by filtration and then dried under reduced pressure. An enzyme sample is obtained as white powder. Yield 3–5% based on the total weight of the initial solid medium components. The enzymatic activity of this sample is determined with the following results.

TABLE 12

| Strain used | Enzyme sample concentration, percent | Time of half decay |
|---|---|---|
| Gibberella fujikuroi G-13 | 0.15 | 30 minutes. |
| Gloeosporium kaki G-12 | 1.0 | 90 minutes. |
| Glomerella fructigena G-10 | 1.0 | 3 hours. |

Note.—Initial viscosity of the test mixture: 150 seconds; water as blank: 10 seconds.

What is claimed is:

1. A process for the production of dextranase which comprises culturing a dextranase-producing microorganism selected from the group consisting of:
    Chaetomium spirale
    Chaetomium gracile
    Chaetomium subspirale
    Chaetomium bostrychodes
    Streptomyces cinnamonensis
    Streptomyces flavovirens
    Streptomyces griseocarneus
    Streptomyces griseolus
    Gibberella fujikouri
    Gibberella saubinetii
    Gloeosporium kaki
    Gloeosporium laeticolor
    Gloeosporium olivarum
    Glomerella fructigena
    Glomerella lagenaria
    Humicola grisea
    Sporotrichum asteroides
    Anixiella reticulata, and
    Macrosporium bataticola
in a fermentation medium and recovering from said medium the dextranase accumulated therein.

2. The process according to claim 1 wherein said dextranase-producing microorganism is Chaetomium spirale.

3. The process according to claim 1 wherein said dextranase-producing microorganism is Chaetomium gracile.

4. The process according to claim 1 wherein said dextranase-producing microorganism is Sporotrichum asteroides.

5. The process according to claim 1 wherein said dextranase-producing microorganism is Gibberella fujikuroi.

References Cited

UNITED STATES PATENTS 2,742,399  4/1956  Tsuchiya et al. ----- 195—66 R
3,649,454  3/1972  Isono et al. -------- 195—62 R A. LOUIS MONACELL, Primary Examiner G. M. NATH, Assistant Examiner U.S. Cl. X.R.
424—50